US012624814B2

(12) United States Patent
Monnier et al.

(10) Patent No.: US 12,624,814 B2
(45) Date of Patent: May 12, 2026

(54) MOTOR-VEHICLE LIGHTING DEVICE

(71) Applicant: VALEO VISION, Bobigny (FR)

(72) Inventors: Remi Monnier, Bobigny (FR); Sebastien Roels, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/867,535

(22) PCT Filed: May 17, 2023

(86) PCT No.: PCT/EP2023/063394
§ 371 (c)(1),
(2) Date: Nov. 20, 2024

(87) PCT Pub. No.: WO2023/232488
PCT Pub. Date: Dec. 7, 2023

(65) Prior Publication Data

US 2025/0383061 A1 Dec. 18, 2025

(30) Foreign Application Priority Data

May 30, 2022 (FR) ...................................... 2205157

(51) Int. Cl.
*F21S 41/657* (2018.01)
*F21S 41/64* (2018.01)
*F21S 41/675* (2018.01)

(52) U.S. Cl.
CPC ........... *F21S 41/657* (2018.01); *F21S 41/645* (2018.01); *F21S 41/675* (2018.01)

(58) Field of Classification Search
CPC ....... F21S 41/645; F21S 41/657; F21S 41/675
USPC ................................ 362/318, 523, 530–532
See application file for complete search history.

(56) References Cited

U.S. PATENT DOCUMENTS

| | | | | |
|---|---|---|---|---|
| 5,023,758 A * | 6/1991 | Allen | .................... | F21S 41/645 362/346 |
| 6,309,094 B1 | 10/2001 | Woerner | | |
| 2019/0092220 A1* | 3/2019 | Aizawa | ................ | B60Q 1/0064 |

FOREIGN PATENT DOCUMENTS

| | | | |
|---|---|---|---|
| DE | 19946350 A1 | 3/2001 | |
| DE | 10213453 A1 | 11/2003 | |
| FR | 3046578 A1 | 7/2017 | |
| WO | 2021009018 A1 | 1/2021 | |

(Continued)

OTHER PUBLICATIONS

European Patent Office, International Search Report (with English translation) and Written Opinion of corresponding PCT Application No. PCT/EP2023/063394, dated Sep. 13, 2023.

(Continued)

*Primary Examiner* — Thomas M Sember
(74) *Attorney, Agent, or Firm* — Valeo Vision

(57) ABSTRACT

The present invention is a lighting device configured to project a light beam. The lighting device includes a light-emitting module configured to generate the light beam mainly along a longitudinal optical axis and a screen having a main region through which the light beam is projected. The lighting device includes a system for rotating the light-emitting module that is able to make the light-emitting module move from a first position to a second position about an axis of rotation. The axis of rotation of the light-emitting module is at distance from the light-emitting module, in a space bounded longitudinally by the screen and the light-emitting module.

10 Claims, 2 Drawing Sheets

(56) References Cited

FOREIGN PATENT DOCUMENTS

| | | | |
|---|---|---|---|
| WO | 2021199262 | A1 | 10/2021 |
| WO | 2022129617 | A1 | 6/2022 |

OTHER PUBLICATIONS

European Patent Office, Office Action of corresponding European Application No. 23728664.6, dated Dec. 18, 2025, 11 pages.

* cited by examiner

MOTOR-VEHICLE LIGHTING DEVICE

TECHNICAL FIELD

The invention relates to the field of lighting and/or light-based signaling in the automotive field and, more particularly, to the systems for adjusting the position of luminous modules of a lighting device for an automotive vehicle.

BACKGROUND OF THE INVENTION

The field of lighting and/or light-based signaling in automotive vehicles is subject to regulations which dictate that each automotive vehicle must be equipped with luminous modules adapted to generate illumination beams performing specific safety functions, notably including a low beam function. Low beam allows an automotive vehicle to be seen by other road users and allows its driver to see the roadway properly out to a distance of 30 meters, without dazzling other users on the road. To this end, the luminous modules generating the low beam, and in particular an assembly formed of at least one light source, a reflective surface and a projection lens, are arranged in a precise theoretical position so that the illumination beam generated when the light source is switched on remains below a predetermined horizon line.

The luminous module is housed in a headlamp closed by a protective outer lens through which the illumination beam is made to pass in order to illuminate the road setting, and this protective outer lens may have a shape specifically associated with the automotive manufacturer offering this lighting device, this specific shape forming a signature of the manufacturer which is recognizable to road users.

When the automotive vehicle is carrying a heavy load and the rear of the vehicle is lower than usual, the inclination of the luminous modules is modified in line with the general inclination of the vehicle, and the illumination beam may be directed differently to what is intended, in particular above the predetermined horizon line, something which may dazzle other road users.

It is known practice to associate the luminous module with a device for adjusting the inclination of the luminous module in order either to lower the low beam of the automotive vehicle when it is transporting a heavy load or, conversely, to raise the low beam once the automotive vehicle has been unloaded. The adjustment device is arranged within the housing of the headlamp and acts on the position of the luminous module within this housing, in particular to pivot the luminous module about an axis of rotation, which has the effect of varying the inclination of the luminous module relative to the housing of the headlamp.

In this context, automotive manufacturers or equipment suppliers are forced to provide protective outer lenses that are wider than necessary so that the illumination beam generated by the luminous module passes through the protective outer lens and is not projected against a wall that contributes toward delimiting the opening in which the protective outer lens is inserted, regardless of the inclination of the luminous module.

Therefore, even though such a solution makes it possible to meet regulatory requirements, it leads to situations in which a gap appears locally between the wall that contributes toward delimiting the opening and an edge of the illumination beam in one or other of the positions of the luminous module, which is detrimental to the signature of the illumination beam.

SUMMARY OF THE INVENTION

The present invention thus proposes an alternative to the existing solutions, having as main subject matter a lighting device configured to project a light beam, the lighting device comprising a luminous module configured to generate the light beam mainly along a longitudinal optical axis and a screen having a main area through which the light beam is projected when the luminous module is in a first position, the lighting device comprising a system for rotational movement of the luminous module adapted to make the luminous module movable from the first position to a second position by a movement involving at least one rotation about an axis of rotation, remarkable in that the axis of rotation of the luminous module is at a distance from the luminous module, passing through a space delimited longitudinally by the main area of the screen and the luminous module.

Such a lighting device may be installed on a vehicle to be used for low beam lighting, for example. The lighting device generates a beam capable of illuminating the road for the vehicle in which it is fitted.

More specifically, it is the luminous module that generates the light beam and the latter is projected toward the road through the screen such that the driver can see the road and be seen by other users without dazzling them. The system for rotational movement of the luminous module makes it possible to ensure that road users are not dazzled regardless of the vehicle's load and therefore its inclination with respect to the road.

The movement of the luminous module by this rotational movement system is a movement involving at least one rotation about an axis of rotation, such that this movement may consist of a rotation alone about an axis of rotation, the combination of a rotation about a given axis of rotation and a translation, or the combination of several rotations to form a complex movement, at least one of the rotations being about an axis of rotation which passes through the space delimited longitudinally by the main area of the screen and the luminous module. More generally, the movement of the luminous module is performed by a rotation about an instantaneous axis of rotation, said instantaneous axis of rotation moving according to a movement of any possible type, the instantaneous axis of rotation passing through the space delimited longitudinally by the main area of the screen and the luminous module in all stages of the movement. Such an instantaneous axis of rotation may for example be created by a combination of simultaneous small translational movements of two different portions of the luminous module, each of the two portions moving in a given direction different from that of the other of the two portions.

According to the invention, the luminous module is made movable with at least one rotational movement about an axis of rotation which passes through a space delimited longitudinally by the screen and the luminous module, which in other words means that the axis of rotation of this at least one rotational movement extends between the luminous module and the main area of the screen and that it is notably at a distance from the luminous module, offset toward the screen. Depending on a possible curve of the screen and in particular of the main area of the screen, and depending on the position of the axis of rotation in the space delimited by the main area of the screen and the luminous module and in particular the proximity of this axis of rotation to the main area of the screen, the axis of rotation may be caused to intersect the screen.

The luminous module is installed in a headlamp housing at a distance from the screen, at least partially, in particular completely, closing off an opening in this housing, and the offset of the axis of rotation of the luminous module at a distance from said luminous module in the direction of the screen makes it possible to ensure that the projection of the light beam is always substantially centered on the main area of the screen and that therefore both the regulatory aspect of the projected illumination beam and the esthetic appearance, or signature, of the vehicle equipped with the lighting device are respected.

The lighting device may also include one or more of the following features, separately or in combination.

According to another optional feature of the invention, the luminous module comprises a light source and an optical element, the light source being configured to emit light rays toward the optical element which is configured to generate the light beam toward the screen.

As non-limiting examples of the invention, the optical element may consist of a lens onto which the light rays exiting the light source are directly directed, a reflector configured to recover and guide the light rays into a light beam directed toward the screen, or a combination of these two elements with at least one reflective element and a lens, the light source being configured to emit light rays toward the reflective element such that the rays are reflected toward the lens, the lens being configured to generate the light beam toward the screen.

According to another optional feature of the invention, the screen is arranged at a distance from the lens.

According to another optional feature of the invention, the axis of rotation is perpendicular to the optical axis and intersects the screen. In other words, the axis of rotation is transverse and extends in the space delimited by the screen and the luminous module, passing through at least one point on the screen.

According to another optional feature of the invention, the axis of rotation intersects the screen in the main area of the screen.

According to another optional feature of the invention, the screen has at least one curvature about a direction perpendicular to the optical axis, the space being delimited by vertical and transverse planes passing through edges delimiting the screen. In other words, the screen is configured such that it has a curved profile in at least one plane comprising the optical axis, and in particular at least one vertical plane or transverse plane. Curved profile means that the screen has a shape that is not contained in one plane. More generally, curved means that at least one of the inner and outer faces, as defined below, is not contained in one plane. The vertical and transverse planes are to be considered to be planes that are respectively perpendicular to the longitudinal optical axis, and perpendicular to one another. Note that the naming of these plans is arbitrary and may be independent of a vertical or transverse orientation of the vehicle in which the lighting device is intended to be installed.

More particularly, the screen may be configured such that it has a curved profile in a vertical plane comprising the optical axis and a curved profile in a transverse plane comprising the optical axis.

The space through which, according to the invention, the axis of rotation of the luminous module passes is delimited by vertical and transverse planes passing through edges delimiting the screen, or more particularly edges delimiting the main area of the screen.

According to another optional feature of the invention, the screen is fixed relative to a headlamp housing attached to an automotive vehicle, such that it is held in place when the luminous module moves from one position to another.

According to another optional feature of the invention, the screen comprises a peripheral area that is peripheral to the main area and configured to at least partially diffuse additional light rays. It will be appreciated that the additional light rays are different to the light rays constituting the light beam. The additional light rays are in this case used, for example, for signaling.

According to another optional feature of the invention, the lighting device comprises at least one additional source configured to generate the additional light rays.

According to another optional feature of the invention, the screen has an inner face oriented toward the luminous module, an outer face oriented toward the outside of the lighting device, and two opposite lateral side edges between which the inner face and the outer face extend transversely.

According to another optional feature of the invention, the lighting device comprises a controllable liquid crystal screen constituting at least the main area of the screen, the controllable liquid crystal screen being adapted to take on different states of transparency, including at least a projection state and a diffusion state. The projection state corresponds more particularly to a state in which the controllable liquid crystal screen is transparent, that is to say a state in which the screen lets the light beam pass through without significant disruption.

The controllable liquid crystal screen comprises two transparent walls between which extends a controllable liquid crystal polymer which, when stimulated by an electric current, takes on an optical state different from its initial state.

According to another optional feature of the invention, the lighting device comprises a control member for controlling the controllable liquid crystal screen, for changing the controllable liquid crystal screen from a projection state to a diffusion state and vice versa.

When the controllable liquid crystal is in a projection state, the light beam extends along the optical axis, whereas when the controllable liquid crystal is in a diffusion state, the light beam bounces off the controllable liquid crystal in the screen and gives the lighting device a diffuse appearance. As mentioned, the projection state corresponds to a state in which the controllable liquid crystal screen is transparent, without significantly impacting the propagation of the light beam passing through it, whereas the diffusion state corresponds to a state in which it is desired that the screen have a diffusing impact on the light beam.

According to another optional feature of the invention, the controllable liquid crystal screen comprises at least two portions, the control member being adapted to change the state of one and/or the other of the portions of the controllable liquid crystal screen. One portion of the controllable liquid crystal screen forms the main area, and the other portion forms the peripheral area.

According to another optional feature of the invention, the lighting device comprises a housing to which is attached, on the one hand, the screen and on the other hand, the system for movement of the luminous module.

The invention also relates to an automotive vehicle equipped with at least one lighting device as set out above.

BRIEF DESCRIPTION OF DRAWINGS

Further features, details and advantages of the invention will become more clearly apparent from reading the following description and a number of examples of embodiments provided by way of non-limiting illustration, with reference to the appended schematic drawings, in which.

DETAILED DESCRIPTION OF THE INVENTION

The features, variants and the various embodiments of the invention can be combined with one another, in various combinations, provided that they are not mutually incompatible or mutually exclusive. In particular, it is possible to envisage variants of the invention that comprise only a selection of features described below, independently of the other features described, if this selection of features is sufficient to confer a technical advantage and/or to differentiate the invention from the prior art.

In the figures, elements that are common to multiple figures retain the same reference sign.

In the following detailed description, the terms "longitudinal", "transverse" and "vertical" refer to the orientation of a lighting device according to the invention. A longitudinal direction corresponds to a direction parallel to the optical axis of a light beam generated by the lighting device, this longitudinal direction being parallel to a longitudinal axis L of a reference system L, V, T shown in the figures. A transverse direction corresponds to a direction parallel to an axis of rotation of a luminous module of the lighting device, this transverse direction being parallel to a transverse axis T of the reference system L, V, T and this transverse axis T being perpendicular to the longitudinal axis L. Lastly, a vertical direction corresponds to a direction parallel to a vertical axis V of the reference system L, V, T, this vertical axis V being perpendicular to the longitudinal axis L and to the transverse axis T.

Figure 1:
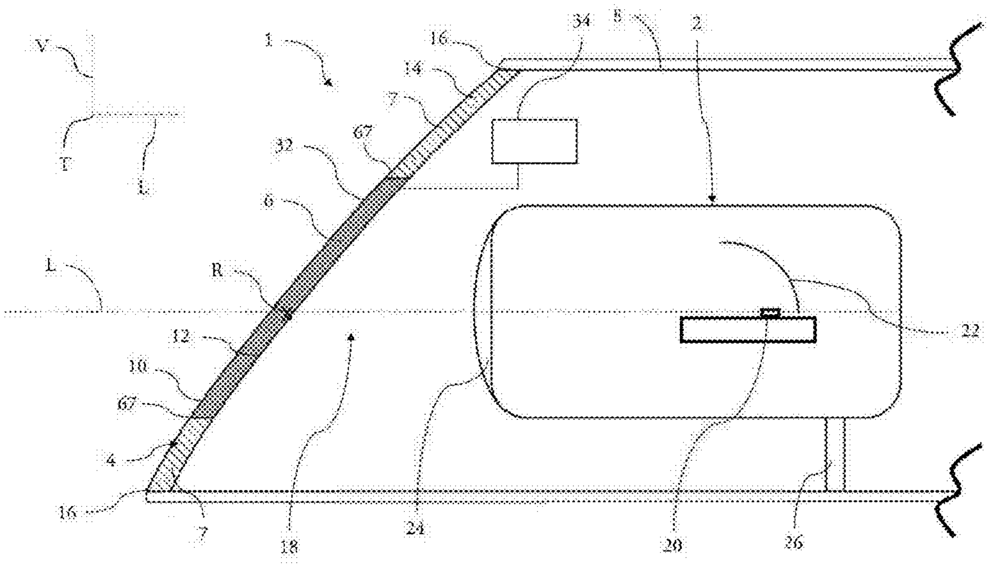
FIG. 1 schematically depicts a lighting device according to the invention, showing in particular a luminous module that can be rotated inside a headlamp housing by a rotational movement device shown schematically.

FIG. 1 depicts a lighting device 1 configured to be mounted on an automotive vehicle and to project a light beam, and in particular an illumination beam of low beam type intended to illuminate the road in front of the automotive vehicle on which it is fitted.

More specifically, the lighting device 1 comprises a luminous module 2 configured to generate the light beam mainly along a longitudinal optical axis L and a screen 4 having a main area 6 through which the light beam is projected and a peripheral area 7 which borders the main area 6. The luminous module 2 in this case generates the light beam which is guided toward the main area 6 of the screen 4 so as to be projected onto the road in front of the automotive vehicle in order to illuminate the road in front of the automotive vehicle while being visible to other road users.

Vertical transition edges 67 and transverse transition edges 76 are arbitrarily defined as being the junction areas on the screen between the main area 6 and the peripheral area 7, respectively arranged on either side of the main area in the vertical direction V and in the transverse direction T.

Advantageously, the main area 6 is centered both in the vertical direction V between the vertical edges of the screen, and in the transverse direction T between the transverse edges of this screen.

As shown in FIG. 1, the lighting device 1 comprises a housing 8 having an opening, to which housing the screen 4 is attached and in which the luminous module 2 is housed. The screen 4 at least partially closes off the opening in the housing 8, having an outer face 10 oriented toward the outside of the lighting device 1, and an inner face 12 which contributes toward delimiting at least partially a housing for the luminous module 2.

Figure 2:
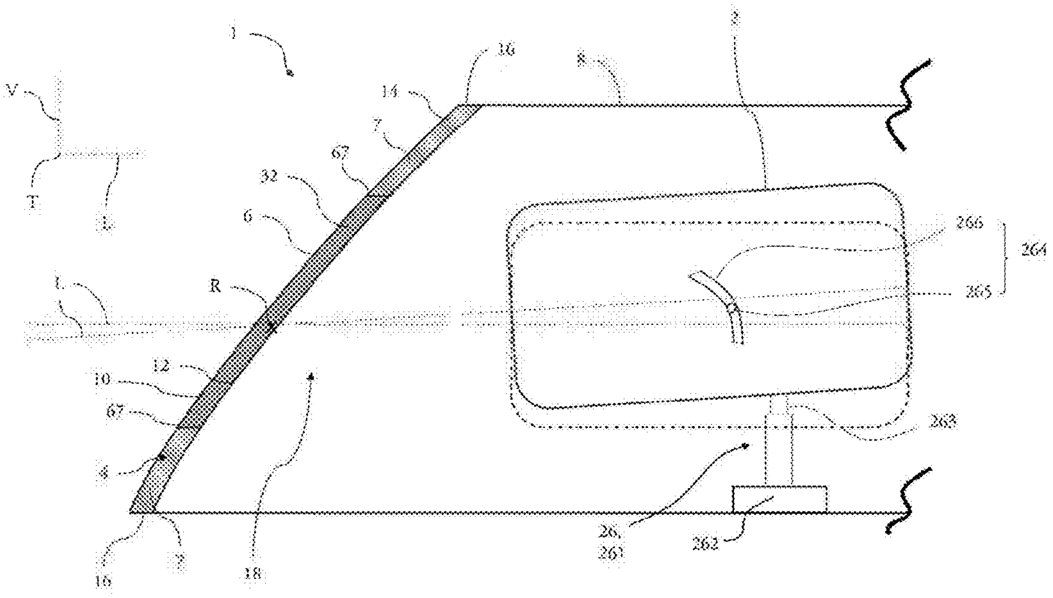
FIG. 2 schematically depicts two different positions of the luminous module within the lighting device of FIG. 1, an example of a rotational movement device being shown in more detail.
Figure 3:
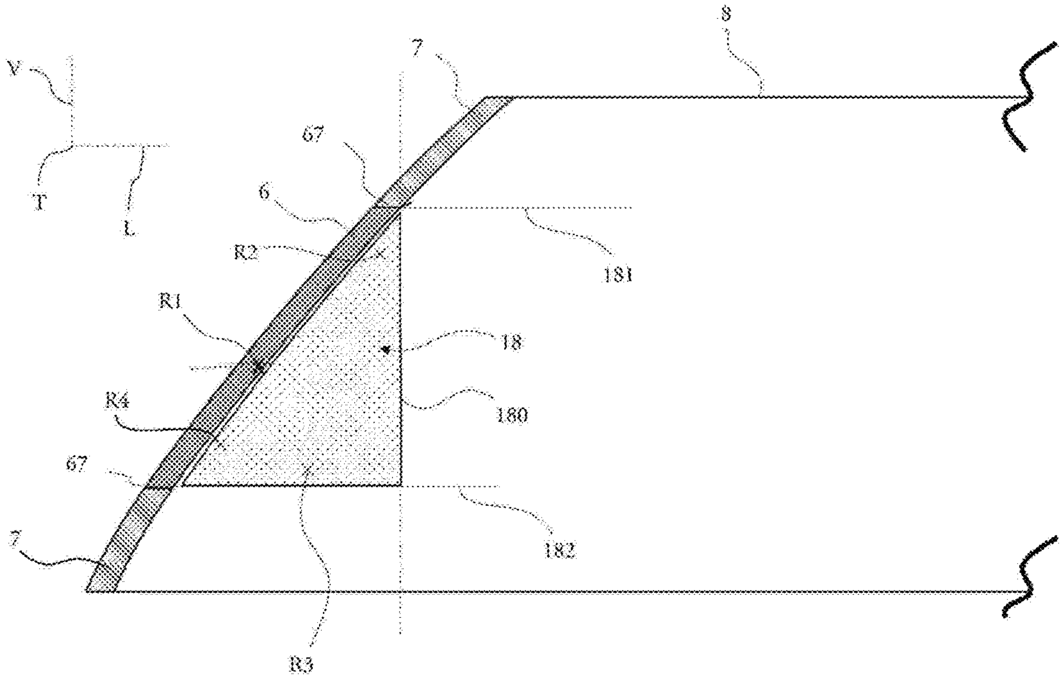
FIG. 3 is a simplified view of the headlamp housing showing the boundaries delimiting a space within which the axis of rotation of the luminous module must pass.
Figure 4:
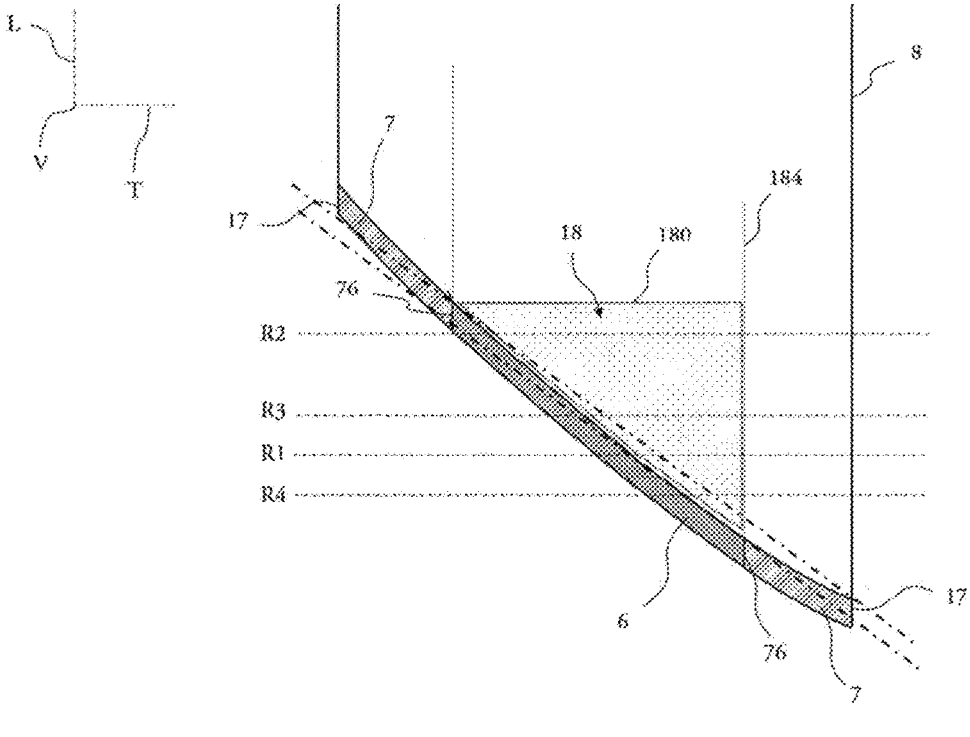
FIG. 4 is a simplified view of the headlamp housing, in a different section plane than in FIG. 3, showing other boundaries delimiting this space.

The screen 4 has a complex profile with a first curvature visible in FIGS. 1 to 3 and arranged about a first direction perpendicular to the optical axis L, in this case the transverse direction T, and at least a second curvature visible in FIG. 4 and arranged about a second direction perpendicular to the first direction and to the optical axis L, in this case the vertical direction. This complex profile notably allows the screen, and the headlamp of which the screen forms part, to be inscribed in the continuity of the curve of the vehicle, at the junction of the wing and the front face.

The screen 4 is delimited by two vertical end edges 16 and by two transverse end edges 17 and the abovementioned complex profile of the screen means that, as can be seen in FIGS. 1 to 3, the two vertical end edges 16 may be offset longitudinally relative to one another and that, as can be seen in FIG. 4, the two transverse end edges 17 may also be offset longitudinally relative to one another.

Similarly, the main area 6 may have this double curvature both transversely and vertically, such that the vertical transition edges 67 and the transverse transition edges 76 are likewise offset longitudinally relative to one another.

This longitudinal offset of the vertical transition edges 67 and transverse transition edges 76 helps to delimit a space 18, set back from the screen, in other words between the screen and the luminous module, with planes passing through the vertical transition edges and the transverse transition edges forming boundaries of the space 18. More specifically, the space 18 is delimited longitudinally between the screen 4 and the vertical and transverse plane 180 passing through the vertical transition edge 67 closest to the luminous module, namely conventionally the upper transition edge as shown in FIGS. 1 to 3 for example, delimited vertically between the longitudinal and transverse planes 181, 182 passing respectively through one of the vertical transition edges 67 and delimited transversely between the screen 4 and the longitudinal and vertical plane 184 passing through the transverse transition edge 76 furthest from the luminous module, namely conventionally the transverse transition edge facing the interior of the vehicle, as shown in FIG. 4 for example. The vertical transition edge 67 closest to the luminous module may also be, in some cases, the upper transition edge. The transverse transition edge 76 furthest from the luminous module may also be, in some cases, the transverse transition edge facing the exterior of the vehicle. When the lighting device is in the position of mounting on the vehicle, "facing the interior of the vehicle"

means that the element having this feature is located on the side oriented toward the median axis of the vehicle, and "facing the exterior of the vehicle" means that the element having this feature is located on the side oriented toward the wing of the vehicle, where applicable in comparison with another element.

According to the invention, and as will be explained more specifically below, in particular with reference to FIGS. 3 and 4, the luminous module is made movable in rotation such that the axis of rotation is arranged in the vicinity of the screen 4 and more particularly in the space 18 so as to intersect the screen 4 at at least one point. Note that the space 18 is in this case vertically bounded by the vertical transition edges 67 and transverse transition edges 76, because the screen 4 is divided into a main area 6 and a peripheral area 7, but that the space would be similarly bounded by the vertical end edges 16 and the transverse end edges 17 if the screen 4 were to be produced uniformly without any discontinuity between areas.

The luminous module 2 is arranged in the headlamp such that the light beam exiting the luminous module can be projected onto the main area 6 of the screen 4 both in a standard position, which corresponds to a theoretical position of the luminous module when it is mounted in the headlamp and the vehicle is not carrying any particular load, and in an inclined compensation position, which corresponds to a position pivoted with respect to the standard position to compensate for the inclination of the vehicle when the vehicle is overloaded, and obtained by means of a rotational movement system which will be described below.

The luminous module 2 preferably comprises a light source 20, at least one reflective element 22 and a lens 24. The light source 20 is configured to emit light rays toward the reflective element 22 such that the rays are reflected, forming a light beam directed toward the lens 24, the lens 24 being configured to project the light beam and generate a corresponding illumination beam toward the screen 4. In other words, the reflective element 22 groups together the light rays emitted by the light source 20 to direct a maximum thereof toward the lens 24. The lens 24 is configured more particularly to project the illumination beam toward the main area 6 of the screen 4.

In another embodiment, the luminous module comprises at least one reflective element 22 configured to reflect light rays from the light source 20 toward the screen 4, in particular toward the main area 6. In this case the presence of a lens is not necessary.

In yet another embodiment, the luminous module comprises a lens 24 configured to receive light rays directly from the light source 20 and project them toward the screen 4, in particular toward the main area 6.

In other embodiments, several of the embodiments described above in relation to the light source 20, the at least one reflective element 22 and/or the lens 24 are combined. For example, the luminous module comprises at least one reflective element 22 and a lens 24, some of the rays emitted by the light source 20 being reflected by the reflective element 22 toward the screen 4, in particular toward the main area 6, while other rays emitted by the light source 20 are reflected by the reflective element 22 toward the lens 24, the lens 24 being configured to project these rays toward the screen 4, in particular toward the main area 6.

The lighting device 1 comprises a system for rotational movement 26 of the luminous module 2 adapted to make the luminous module 2 movable, about an axis of rotation R, from a first position, namely the standard position mentioned above, to a second position, namely the inclined compensation position.

The movement system 26 is controlled by an appropriate control unit, which is configured to receive data relating to the inclination of the vehicle chassis, for example due to overloading, and which determines accordingly an inclination to be given to the luminous module 2 so that it takes up the inclined compensation position, or second position, mentioned above and shown by way of example in FIG. 2 in solid lines.

To facilitate understanding, the first position of the luminous module 2, or standard position, has been shown in this FIG. 2 in dotted lines. The movement of the luminous module 2 from one position to the other is independent of the housing 8 of the lighting device 1, and of the screen 4 at least partially closing off the opening in the housing 8, such that the rotation of the luminous module 2 about the axis of rotation R can be considered to be a relative rotation with respect to the housing and the screen.

According to the invention, the rotational movement system 26 is configured so that the axis of rotation R of the luminous module 2 extends transversely at a distance from the luminous module 2, toward the screen 4. More specifically, the axis of rotation R, substantially transverse, extends in the space 18 previously defined set back from the screen 4, so as to intersect the screen 4 at at least one point, or passes through the screen 4 over the entire transverse dimension of the headlamp. This particularly clever arrangement of the axis of rotation R makes it possible to ensure that the projection of the illumination beam by the luminous module 2 is always in the main area 6 of the screen 4, whether the luminous module 2 is in the first position or in the second position.

The rotational movement system 26 may in particular consist of the combination of a telescopic thrust device 261, of which a base 262 is rigidly secured to the housing 8 and a free end of a piston 263 bears against the luminous module 2, and at least one guide device 264 comprising a pin 265 and a groove 266 of which the curvature is centered on the point C arranged at the junction of a vertical longitudinal plane passing through the main area of the screen and the desired axis of rotation of the luminous module. Schematically, and without limiting the invention, FIG. 2 depicts such a movement system with a groove formed on the luminous module and a fixed pin rigidly secured to the housing, it being understood that several of these guide devices may be formed on the same face of the luminous module and/or on opposite faces.

In another example, the guide device comprises two pins and two grooves, in particular each of rectilinear shape, superimposed in the vertical direction, and each oriented in a different direction to the other, each of the grooves being associated with one of the two pins. When the piston of the telescopic thrust device pushes on the luminous module, each pin moves in translation in its associated groove, in the direction of the latter. The combination of each elementary translation of each of the pins in different directions generates a rotation about an instantaneous axis of rotation. This instantaneous axis of rotation shifts slightly if the full range of movement between the two possible extreme positions is taken into consideration.

According to the invention, as mentioned above, the axis of rotation R, about which the luminous module rotates when the rotational movement system 26 is activated, is a transverse axis offset from the luminous module which extends across the screen, or which at the very least intersects the main area 6 of the screen at at least one point. In other words, the axis of rotation passes through the space 18 delimited between the screen and the luminous module by the position of the two vertical end edges 16 and the two transverse end edges 17, or where applicable by the position of the vertical transition edges 67 and the transverse transition edges 76 between the main area 6 and the peripheral area 7. FIGS. 3 and 4 in particular show the definition of the space 18 by the position of the vertical transition edges 67 and the transverse transition edges 76 between the main area 6 and the peripheral area 7.

More specifically, FIG. 3 shows longitudinal and vertical boundaries of the space 18, and FIG. 4 shows the longitudinal boundaries and transverse boundaries of this same space 18, with four examples of the axis of rotation R1, R2, R3, R4 in accordance with the invention, that is to say intersecting, at at least one point, the screen, and more particularly in this case the main area 6 of the screen.

The longitudinal boundaries of the space 18 are in this case formed on the one hand by the portion of the main area of the screen 4 located furthest forward on the vehicle, in other words furthest from the luminous module, and on the other hand by the vertical and transverse plane 180 passing through the upper transition edge positioned between the main area 6 and the peripheral area 7. The vertical boundaries of the space 18 are in this case formed on the one hand by a first longitudinal and transverse plane 181 passing through the upper vertical transition edge and on the other hand by a second longitudinal and transverse plane 182 passing through the lower vertical transition edge.

The transverse boundaries of the space 18, visible in FIG. 4, are in this case formed on the one hand by the portion of the main area of the screen 4 located furthest to the outside of the vehicle and on the other hand by the longitudinal and vertical plane 184 passing through the transverse transition edge 76 furthest from the luminous module, namely conventionally the transverse transition edge facing the interior of the vehicle, as shown in FIG. 4 for example.

As shown in FIGS. 3 and 4, each of the axes of rotation allowing the luminous module to be made movable in accordance with the invention is included in the space 18, advantageously over the entire transverse dimension of the luminous module. Without departing from the context of the invention, the axis of rotation could alternatively have an inclination relative to the transverse direction, provided that this axis intersects, at least once, the screen 4 and more particularly in this case the main area 6 of the screen. Two examples of this alternative are shown in FIG. 4, in bold chain line.

The peripheral area 7 may in particular be configured to have a coefficient of diffusion of light rays which is greater than the same coefficient, substantially zero, of the main area of the screen. Where applicable, this peripheral area may be intended to have additional light rays, coming from a source separate to the luminous module 2, passing through it. It will be appreciated that the additional light rays are different to the light rays constituting the light beam generated by the luminous module, and that they may be used for example for signaling. In this particular embodiment, the light beam passing through the main area 6 of the screen 4 is used for illumination purposes, while the additional light rays projected against the peripheral area 7 are used for signaling purposes.

To this end, the lighting device 1 comprises at least one additional source configured to generate the additional light rays. The additional source may, for example, include several light-emitting diodes, commonly called LEDs.

By way of example, the lighting device 1 comprises a controllable liquid crystal screen 32 constituting at least the main area 6 of the screen 4, the controllable liquid crystal screen 32 being adapted to take on different states of transparency, including at least a projection state and a diffusion state. The controllable liquid crystal screen 32 comprises two transparent walls between which extends a controllable liquid crystal polymer which, when stimulated by an electric current, takes on an optical state different from its initial state. Note that the transparent walls are optically neutral, and that it is the controllable liquid crystal polymer that impacts the state of the controllable liquid crystal screen 32, by allowing or preventing the diffusion of light rays through the main area 6 of said screen 4.

The liquid crystals in suspension in the controllable liquid crystal polymer are oriented differently depending on whether they are electrically stimulated or not. To be specific, when they are electrically stimulated, the liquid crystals are organized such that the light beam passes through the screen 4 along the optical axis L. In the absence of electrical stimulation, the liquid crystals are arranged randomly, at least partially blocking the passage of the light beam through the screen 4, the light rays being deflected by the liquid crystals.

As shown in FIG. 1, the lighting device 1 comprises a control member 34 for controlling the controllable liquid crystal screen 32, for changing the controllable liquid crystal screen 32 from a projection state to a diffusion state and vice versa. The control member 34 is electrically connected to the screen 4 and is configured to emit or not emit electrical stimulation. In other words, when the control member 34 electrically stimulates the controllable liquid crystal screen 32, this screen is in a projection state and the illumination light beam generated by the luminous module 2 can pass through the main area 6 of the screen 4 along the optical axis L without significant disruption. Conversely, when the control member 34 does not electrically stimulate the controllable liquid crystal screen 32, this screen is in a diffusion state and the light beam generated by the luminous module is either made diffuse or blocked by the liquid crystals arranged in the screen 4.

In another example of an embodiment, the entire screen 4 is a controllable liquid crystal screen 32, a first portion forming the main area 6 while a second portion forms the peripheral area 7. The control member 34 is in this example configured to transmit only to one or the other of the portions electrical stimulation independently of the other portion. Preferably, the control member 34 generates electrical stimulation only for the first portion, the second portion of the controllable liquid crystal screen 32 remaining in a diffusion state, whereas the first portion may be in a projection state or a diffusion state depending on whether or not it is electrically stimulated by the control member 34.

In each of these examples of embodiments, it is advantageous for the luminous module 2 to be adapted to generate a beam centered on the main area 6 of the screen and it is important that the axis of rotation R pass through at least one point in the space 18 delimited by the screen 4 and planes passing through the transition edges 67, 76 forming a junction between the main area 6 of the screen and the peripheral area 7.

The present invention is not however limited to the means and configurations described and illustrated in the present document, and also extends to all equivalent means and configurations and to any technically operational combination of such means.

What is claimed is:

1. A lighting device configured to project a light beam, the lighting device comprising a luminous module configured to generate the light beam mainly along a longitudinal optical axis and a screen having a main area through which the light beam is projected when the luminous module is in a first position, a system for rotational movement of the luminous module adapted to make the luminous module movable from the first position to a second position by a movement involving at least one rotation about an axis of rotation, the axis of rotation of the luminous module is at a distance from the luminous module, passing through a space delimited longitudinally by the main area of the screen and the luminous module.

2. The lighting device as claimed in claim 1, wherein the luminous module includes a light source and an optical element, the light source being configured to emit light rays toward the optical element which is configured to generate the light beam toward the screen.

3. The lighting device as claimed in claim 1, wherein the axis of rotation is perpendicular to the optical axis and intersects the screen.

4. The lighting device as claimed in claim 1, wherein the screen has at least one curvature about a direction perpendicular to the optical axis, the space being delimited by vertical and transverse planes passing through edges delimiting the screen.

5. The lighting device as claimed in claim 1, wherein the screen includes a peripheral area that is peripheral to the main area and configured to at least partially diffuse additional light rays.

6. The lighting device as claimed in claim 1, further comprising a controllable liquid crystal screen constituting at least the main area of the screen, the controllable liquid crystal screen being adapted to take on different states of transparency, including at least a projection state and a diffusion state.

7. The lighting device as claimed in claim 6, further comprising a control member for controlling the controllable liquid crystal screen, for changing the controllable liquid crystal screen from a projection state to a diffusion state and vice versa.

8. The lighting device as claimed in claim 7, wherein the controllable liquid crystal screen includes at least two portions, the control member being adapted to change the state of one and/or the other of the portions of the controllable liquid crystal screen.

9. The lighting device as claimed in claim 1, further comprising a housing to which is attached to the screen and to the system for movement of the luminous module.

10. An automotive vehicle equipped with at least one lighting device including a luminous module configured to generate the light beam mainly along a longitudinal optical axis and a screen having a main area through which the light beam is projected when the luminous module is in a first position, a system for rotational movement of the luminous module adapted to make the luminous module movable from the first position to a second position by a movement involving at least one rotation about an axis of rotation, the axis of rotation of the luminous module is at a distance from the luminous module, passing through a space delimited longitudinally by the main area of the screen and the luminous module.

* * * * *